(12) United States Patent
Kocarev et al.

(10) Patent No.: US 7,779,060 B2
(45) Date of Patent: Aug. 17, 2010

(54) METHOD OF GENERATING A CHAOS-BASED PSEUDO-RANDOM SEQUENCE AND A HARDWARE GENERATOR OF CHAOS-BASED PSEUDO RANDOM BIT SEQUENCES

(75) Inventors: Ljupco Kocarev, San Diego, CA (US); Paolo Amato, Limbiate (IT); Gianguido Rizzotto, Civate (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 922 days.

(21) Appl. No.: 10/712,988

(22) Filed: Nov. 12, 2003

(65) Prior Publication Data
US 2004/0153291 A1 Aug. 5, 2004

(30) Foreign Application Priority Data
Nov. 12, 2002 (EP) .................................. 02425689

(51) Int. Cl.
*G06F 1/02* (2006.01)
(52) U.S. Cl. ...................................... 708/250; 708/253
(58) Field of Classification Search .................. 708/250, 708/252, 254, 255
See application file for complete search history.

(56) References Cited

U.S. PATENT DOCUMENTS

| 4,852,023 A | * | 7/1989 | Lee et al. ..................... 708/253 |
| 5,732,138 A |   | 3/1998 | Noll et al. |
| 6,678,707 B1 | * | 1/2004 | Butler ........................ 708/250 |
| 6,738,411 B1 | * | 5/2004 | Ogawa et al. ............... 375/130 |
| 6,813,625 B2 | * | 11/2004 | Smeets ........................ 708/250 |
| 6,954,770 B1 | * | 10/2005 | Carlson et al. .............. 708/251 |

OTHER PUBLICATIONS

Menezes, Oorschot, Vanstone, "Handbook of Applied Cryptography", Handbook of Applied Cryptography, CRC Press Series on Discrete Mathematics and its Applications, 1997, pp. 362-363.
Silva, Young, "Introduction to Chaos-based Communication and Signal Processing", The Aerospace Corporation, vol. II, Feb. 1, 2000, pp. 279-299.
Garcia P. et al, "Communication through chaotic map systems", Physics Letters A, North-Holland Ppublishing Co., Amsterdam, NL, vol. 298, No. 1, May 27, 2002.
European Search Report for EP 02 42 5689 dated Dec. 10, 2003.

* cited by examiner

*Primary Examiner*—Chuong D Ngo
(74) *Attorney, Agent, or Firm*—Lisa K. Jorgensen; Kevin D. Jablonski; Graybeal Jackson LLP

(57) ABSTRACT

A method for generating cryptographically secure (or unpredictable) pseudo-random numbers uses simple functions whose inverse is not a well-defined function and has a large number of branches, although the inverse could be easily computed on each particular branch. In this way the sequence of numbers is practically unpredictable and at the same time may be generated using very simple functions. A generator of such a pseudo-random bit sequence comprises circuit means for storing bit strings representing integer numbers of the pseudo-random sequence; a shift register coupled to the circuit means; a command circuit generating shift commands for the shift register; second circuit means for storing the bits output by the shift register; an adder modulo 2 summing the bits stored in the second circuit means, generating a bit of the chaos-based pseudo-random bit sequence; a second adder summing up the bit strings currently stored in the shift register and in the first circuit means, generating a bit string representing a successive number of the pseudo-random sequence.

12 Claims, 2 Drawing Sheets

METHOD OF GENERATING A CHAOS-BASED PSEUDO-RANDOM SEQUENCE AND A HARDWARE GENERATOR OF CHAOS-BASED PSEUDO RANDOM BIT SEQUENCES

PRIORITY CLAIM

This application claims priority from European patent application No. 02425689.3, filed Nov. 12, 2002, which is incorporated herein by reference.

TECHNICAL FIELD

The present invention relates generally to the generation of pseudo random numbers, and in particular to a method for generating a sequence of chaos-based pseudo random numbers and a relative hardware implementation thereof.

BACKGROUND

Pseudo-random number generators (PRNG) are useful in every applications that use Monte Carlo methods and also in cryptography [1]. PRNGs are algorithms implemented on finite-state machines for generating sequences of numbers which appear random-like under many aspects. These sequences are necessarily periodic but their periods are very long, they pass many statistical tests, and they may be easily implemented with simple and fast software routines.

Chaotic systems may be used either in cryptography (see [2Xkjra2001]) and in generating pseudo-random numbers. For example, in a series of papers [3]) a chaos derived pseudo-random number generator has been proposed. It has been numerically observed that the average cycle and transient lengths grow exponentially with the precision of implementation, and from this fact it has been deduced that using high-precision arithmetic it is possible to obtain PRNGs which are still of cryptographic interest. The usual statistical tests applied to PRNGs for use in Monte Carlo simulations are generally simple.

In cryptography, PRNG should not only have good statistical properties, but also be "cryptographically secure", i.e., given a sequence of pseudo random bits it should be impossible to predict the next number of the sequence with a probability much greater than ½. For this reason, PRNGs suitable for cryptographic applications must pass the next-bit test.

The actual cryptographically secure PRNGs are not computationally efficient. Then they are used only for highly critical off-line operations, while for on-line tasks (like stream ciphers) fast but not cryptographically secure PRNGs are employed. The drawback of this fact is that stream ciphers can be attacked by exploiting the weakness of their PRNGs.

Statistical properties of binary sequences generated by class of ergodic maps with some symmetrical properties are discussed in [4]. The authors derived a sufficient condition for this class of maps to produce a sequence of independent and identically distributed binary random variables. However, the implementation of these maps on finite-state machines and the consequence this implementation may have on the randomness of the generated sequences have not been discussed.

For a better comprehension of a possible field of application of the invention, a brief introduction to the basic concepts of pseudo-random bit generations is provided, according to the approach of [1] (see also [5]).

Definition 1 A (truly) random bit generator is a device which outputs a sequence of statistically independent and unbiased binary digits.

A random bit generator can be used to generate random numbers. For a chaos-based generator of truly random bits see [6].

Definition 2 A pseudo-random bit generator (PRBG) is a deterministic algorithm which, given a truly random binary sequence of length k, outputs a binary sequence of length l>>k which "appears" to be random. The input of the PRBG is called the seed, while the output of the PRBG is called a pseudo-random bit sequence.

Definition 3 A pseudo-random bit generator is said to pass all polynomial-time statistical tests if no polynomial-time algorithm can correctly distinguish between an output sequence of the generator and a truly random sequence of the same length with probability significantly greater than ½.

Definition 4 A pseudo-random bit generator is said to pass the next-bit test if there is no polynomial-time algorithm which, on input of the first I bits of an output sequence s, can predict the (I+1)st bit of s with probability significantly greater than ½.

In this case a PRBG is said unpredictable.

Theorem 1 A pseudo-random bit generator passes the next-bit test if and only if it passes all polynomial-time statistical tests.

Definition 5 Let $G=\{G_n, n \geq 1\}$ be an ensemble of generators, with $G_n: \{0,1\}^n \to \{0,1\}^{p(n)}$, where p(*) is a polynomial satisfying $n+1 \leq p(n) \leq n^c + c$ for some fixed integer c. We say that G is a cryptographically secure pseudo-random bit generator if There is a deterministic polynomial-time algorithm that on input of any n-bit string outputs a string of length p(n).

For sufficiently large n, the generator $G_n$ passes the next-bit test.

All above definitions and the theorem are informal. For a formal definition of statistical test (definition 3), see Yao [7]. The notion of a cryptographically secure pseudo-random bit generator was introduced by Blum and Micali [8]. The theorem 1 (universality of the next-bit test) is due to Yao [7].

The last three definitions above are given in complexity-theoretic terms and are asymptotic in nature because the notion of "polynomial-time" is meaningful for asymptotically large inputs only. Therefore, the security results for a particular family of PRBGs are only an indirect indication about the security of individual members.

Blum and Micali [8] presented the following construction of cryptographically secure PRBG. Let D be a finite set, and let f: D→D be a permutation that can be efficiently computed. Let B: D→{0,1} be a Boolean predicate with the property that B(x) is hard to compute given only x∈D, however, B(x) can be efficiently computed given $y = f^{-1}(x)$. The output sequence $z_1, z_2, \ldots, z_l$ corresponding to the seed $x_0 \in D$ is obtained by computing $x_i = f(x_{i-1})$, $z_i = B(x_i)$, for $1 \leq i \leq l$.

Blum and Micali [8] proposed the first concrete instance of cryptographically secure PRBG. Let p be a large prime. Define $D = Z_p^* = \{1, 2, \ldots, p-1\}$ and α a generator of $Z_p^*$. The function f: D→D is defined by $f(x) = \alpha^x \mod p$. The function B: D→{0, 1} is defined by B(x)=1 if $0 \leq \log_\alpha x \leq (p-1)/2$ and B(x)=0 if $\log_\alpha x \geq (p-1)/2$. Assuming the intractability of the discrete logarithm problem in $Z_p^*$, the Blum-Micali generator was proven to satisfy the next-bit test. Other examples of cryptographically secure PRBGs are RSA generator [9] and Blum-Blum-Shub generator [10].

Linear Congruential Generators

A linear congruential generator produces a pseudo-random sequence of numbers $x_1, x_2, \ldots$ according to the linear recurrence $$x_n = (ax_{n-1} + b) \mod m, \, n \geq 1$$

Integers a, b and m are parameters which characterize the generator, while $x_0$ is the seed. Generators of this form are widely used in Monte Carlo methods, taking $x_i/m$ to simulate uniform draws on [0, 1].

For a study of linear congruential generators, see Knuth [11]. Plumstead [12] and Boyar [13] showed how to predict the output sequence of a linear congruential generator given only a few elements of the output sequence, and when the parameters a, b, and m of the generator are unknown. Boyar [13] extended her methods and showed that linear multivariate congruential generators, $$x_n = (a_1 x_{n-1} + a_2 x_{n-2} + \ldots + a_l x_{n-1}) \bmod m$$

and quadratic congruential generators, $$x_n = (a x_{n-1}^2 + b x_{n-1} + c) \bmod m$$

are cryptographically insecure. Krawczyk [14] showed how the output of any multivariate polynomial generator can be efficiently predicted. A truncated linear congruential generator is one where a fraction of the least significant bits of $x_i$ are discarded. Frieze et al. [15] showed that these generators can be efficiently predicted if the parameters a, b, and m are known. Stern [16] extended this method to the case where only m is known. Boyar [17] presented an efficient algorithm for predicting linear congruential generators when O(log log m) bits are discarded, and the parameters are unknown.

No efficient prediction algorithms are known for truncated multivariate polynomial congruential generators.

SUMMARY

In one embodiment of the invention, a method of generating a sequence of a chaos-based pseudo-random numbers and a hardware pseudo-random bit generator are relatively easy to realize. The sequence of numbers is practically unpredictable and at the same time may be generated using very simple functions.

The known methods of generating cryptographically secure (or unpredictable) pseudo-random numbers are based on the use of complicated functions whose inverse is well-defined but is hard to compute. According to the common knowledge this is necessary, because otherwise it would be easy to predict the numbers of a pseudo-random sequence.

As a consequence, known methods are relatively slow and hardware generators that implement them have a quite complex architecture.

On the contrary, a method according to an embodiment of the invention comprises generating pseudo-random numbers by using simple functions, but their inverses are not a well-defined function and have a large number of branches, although the inverse might be easily computed on each particular branch.

More precisely, one embodiment of the present invention is a method for generating a chaos-based pseudo-random sequence comprising the steps of:
- defining a chaotic map for generating a pseudo-random sequence of integer numbers comprised in a certain interval;
- defining a function on the first interval whose inverse has a plurality of branches;
- choosing a seed of the pseudo-random sequence of integer numbers comprised in the interval;
- generating numbers of the pseudo-random sequence;
- calculating numbers of a chaos-based pseudo-random sequence by applying the function to corresponding integer numbers of the pseudo-random sequence.

This method is preferably used for generating chaos-based pseudo-random bit sequences and may be implemented in a hardware generator of chaos-based pseudo random bit sequences, comprising:
- circuit means for storing bit strings representing integer numbers of the pseudo-random sequence;
- a shift register coupled to the circuit means;
- a command circuit generating shift commands for the shift register;
- second circuit means for storing the bits output by the shift register;
- an adder modulo 2 summing the bits stored in the second circuit means, generating a bit of the chaos-based pseudo-random bit sequence;
- a second adder summing up the bit strings currently stored in the shift register and in the first circuit means, generating a bit string representing a successive number of the pseudo-random sequence.

BRIEF DESCRIPTION OF THE DRAWINGS

Different aspects and advantages of the invention will appear even more clearly through the following non-limiting description referring to the attached drawings, wherein.

DESCRIPTION OF SEVERAL EMBODIMENTS OF THE INVENTION

Figure 1:
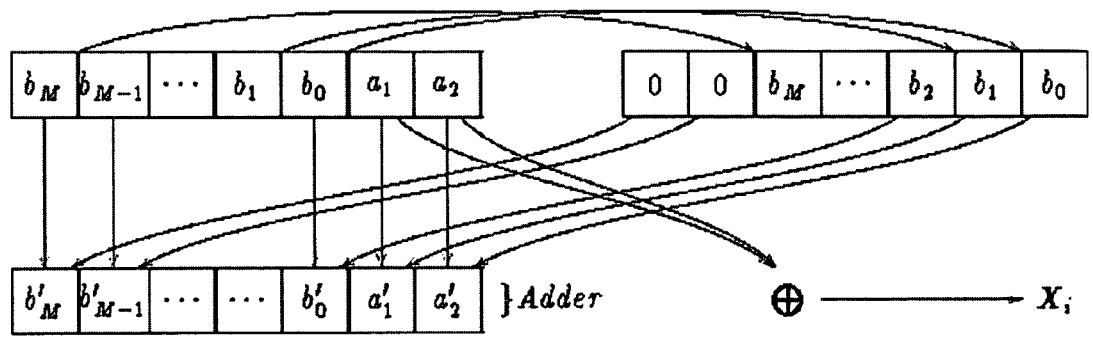
FIG. 1 is a diagram describing in a basic manner a preferred embodiment of the method of the invention for generating chaos-based pseudo-random bit sequences.

In order to illustrate in a easy manner the gist of the invention, let us refer to the following sample algorithm for generating a sequence of (real) numbers $X_1, X_2, \ldots$.

First of all, a chaotic map is chosen:

$$x_{n+1} = f(x_n) = \left(\frac{p}{2^m} \cdot x_n\right) \bmod 2^M \quad (1)$$

where $n = 0, 1, \ldots, x_0 \in [0, 2^m]$, $p > 2^m$, p is an odd integer. The generic term $X_n$ of the sequence is given by $$X_n = H(x_n) = \sin^2(x_n) \quad (2)$$

Is the sequence $X_1, X_2, \ldots$ predictable? In other words, knowing a finite number of elements of this sequence, say $X_j, X_{j+1}, \ldots, X_{j+k-1}$, is it possible to predict the previous and the next elements of the sequence: $X_{j-1}$ and $X_{j+k}$?

Let us start our discussion from the simplest case: p=3 and m=1. Using the following well known relations $$\sin^2\left(\frac{3}{2}\alpha\right) = \frac{1}{2}[1 - \cos(3\alpha)]$$

$$\cos(3\alpha) = \pm\sqrt{1 - \sin^2(3\alpha)}$$

and $$\sin^2(3\alpha) = \sin^2(\alpha) \cdot [3 - 4\sin^2(\alpha)]^2$$

we find $$(2X_{n+1}-1)^2+X_n(3-4X_n)^2=1$$

It is easy to show that for almost all $X_n$ there are 2 equally likely values for $X_{n+1}$. In a similar way, for almost all $X_{n+1}$ there are 3 equally likely values for $X_n$. Furthermore, the number of points $X_i$ for which there are less than 2 values of $X_{i+1}$ (or less than 3 values of $X_{i-1}$) is finite.

This result can be generalized for arbitrary p and m. After a simple algebra we find a functional relation between $X_n$ and $X_{n+1}$:

$$[2\ldots 2((2X_{n+1}-1)^2-1)^2\ldots -1]^2 + F_p(X_n) = 1 \quad (3)$$

where the first term in the left-hand side of this equation is polynomial of order $2^m$ and $F_p$ is the p-th order Chebyshev map. Thus, for arbitrary m and almost all $x_0$, equation (3) has $2^m$ solutions for $X_{n+1}$ when $X_n$ is known and p solutions for $X_n$ when $X_{n+1}$ is known. Therefore, for large m and almost all $x_0$ the sequence $\{X_i\}_1^\infty$ is one-step unpredictable: for any element $X_k$ in the sequence $\{X_i\}_1^\infty$ one can only guess with probability $1/2^m$ (among $2^m$ equally distributed values of $X_{k+1}$) what is next element $X_{k+1}$ and with probability $1/p$ (among p equally distributed values of $X_{k-1}$) what was the previous element $X_{k-1}$. The set of initial conditions $x_0$ for which the above statement does not hold is finite.

What are the properties of the sequence $X_1, X_2, \ldots$? The map H(.) in (2) is not a distribution preserving map and thus the output sequence is not equally distributed. It is possible to avoid this problem using, for example, a periodic tent map instead of the sine function.

There are much more serious problems related to the sequence $X_1, X_2, \ldots$: it has been proved that this sequence is 1-step unpredictable, from which does not follow that the sequence is k-step unpredictable. In fact, the sequence $X_1, X_2, \ldots$ is 3-step predictable as follows from the following analysis.

Let $b_m \ldots b_1 b_0.a_1 a_2 \ldots$ be the binary presentation of $x \in [0, q]$, $q=2^m$ and $x=(b_m, \ldots b_1, b_0; a_1, a_2, \ldots )$. Let us define the functions c(x) and d(x) as $c(x)=b_m \ldots b_1 b_0$, $d(x)=0.a_1 a_2 \ldots$. Suppose to know the value of $d(r \times c \mod q)$, where $$c \in \{0, 1, \ldots, q-1\}, r=p/q, q=2^m, \gcd(p, q)=1, p>q$$

being gcd(.,.) is the greatest common divider function.

Is the value of c predictable? Let $0.r_{-1} \ldots r_{-m}$ and $c_{m-1} \ldots c_1 c_0$ be the binary presentations of d(r) and c, respectively, and let $0.a_1 a_2 \ldots a_m$ be the binary presentation of $d(r \times c \mod q)$. Given that $a_m = c_0 \cdot r_{-m}$ and $r_{-m} = 1$ (p must be an odd number), it holds that $c_0 = a_m$. Therefore, by knowing the value of $a_m$, $c_0$ can be easily determined. Furthermore, from the relation $a_{m-1} = r_{-m+1} \cdot c_0 \oplus r_{-m} \cdot c_1$ and the previously determined value of $c_0$ it is possible to determine the value of $c_1$. By repeating these arguments, the values of all bits $c_0, c_1, \ldots c_m$ may be computed.

Proposition 1 Let $c \in \{0, 1, \ldots, q-1\}$ and $r=p/q$, where $p>q$, $\gcd(p, q)=1$, and $q=2^m$. If we know the value of $d((r \cdot c) \mod q)$, then we can uniquely determine the value of c.

We say that the sequence $X_1, X_2, X_3, \ldots$ is k-step predictable if there exist $X_n, X_{n+1}, \ldots X_{n+k-1}$ such that knowing them one can predict the values of $X_{n-1}$ or $X_{n+k}$.

Theorem 2 The sequence $X_1, X_2, X_3, \ldots$ is 3-step predictable.

Proof. It holds that $X_1=H(x_1)$, $X_2=H(x_2)$ and $X_3=H(x_3)$. Let $c_1=c(x_1)$, $d_1=d(x_1)$, $c_2=c(x_2)$ and $d_2=d(x_2)$. According to the first relation the value of $d_1$ is either $d_{11}=\arcsin(\sqrt{X_1}) \in [0, \pi/2]$ or $d_{12}=\pi-d_{11}$. Analogously, the value of $d_2$ is either $d_{21}=\arcsin(\sqrt{X_2}) \in [0, \pi/2]$ or $d_{22}=\pi-d_{21}$. Furthermore, $x_1$ and $x_2$ are related as $x_2=(r \cdot x_1) \mod q$. Therefore we have $$d_2 = d((r \cdot (c_1 + d_1)) \mod q) = d(d((r \cdot c_1) \mod q) + d((r \cdot d_1) \mod q)) \quad (4)$$

Let $c_1(i, j)$ denote the solution of the equation ($4 \times 1 - 6006r4$) if such a solution exists. There are at most four possible values of $x_1$: $c_1(1, 1)+d_{11}$, $c_1(1, 2)+d_{11}$, $c_1(2, 1)+d_{12}$ and $c_1(2, 2)+d_{12}$. The actual value of $x_1$ can be determined by checking for which of these values, the third member of the sequence is $X_3$. Once the value of $x_1$ is determined, it is easy to compute all subsequent members $X_4, X_5, \ldots$.

There are several ways to generalize equations (1) and (2). First, f(.) in (1) can be an arbitrary chaotic map defined on [0, q], where q is a large integer. Second, H(.) in (2) can be an arbitrary non-periodic function H: [0, q]→[0, 1] such that its inverse $H^{-1}$(.) has q branches. Third, the proof of the theorem 2 uses the fact that H(.) is a periodic function from [0, q] to [0, 1], but, for example, H(.) can be any periodic function H: [0, q]→C, where C is a finite small set, for example C={0,1}. Some of these possibilities are examined hereinafter.

Cryptographically Secure PRNGs

The construction of cryptographically secure PRBGs of Blum and Micali [8] is based on the assumption that the inverse of a function is a well-defined function but is hard to be computed.

On the contrary, according to a method of an embodiment of the present invention, it is possible to have cryptographically secure PRNGs (and thus cryptographically secure PRBGs) using simple functions H(.) whose inverse is not a well-defined function and has large number of branches, although the inverse is easy to compute on a particular branch. In particular, if the inverse of the function H: [0, q]→C has q branches, even knowing a value $X_n$ of the random number sequence $X_1, X_2, \ldots$, the effectively used value $x_n$ such that $X_n=H(x_n)$ may be predicted only with a probability of $1/q$, that is $x_n$ may be any of the integers of the interval [0, q].

This approach is much more convenient than the approach of Blum and Micali [8] because the function H(.) may be very simple, and thus it may be easily implemented for realizing effectively unpredictable sequences of pseudo-random numbers.

Because of the importance of PRBGs, in the ensuing description, reference will be made to a preferred embodiment of the invention for generating a pseudo-random sequence of bits, but what will be stated could be easily repeated, mutatis mutandis, for generators of sequences of pseudo-random numbers.

A class of pseudo random bit generators are designed that use only binary operations and may be implemented as a fast algorithm. To keep the connection with the previous description as close as possible, we slightly alter the notation and write $X_j$ for the output sequence of bits.

Let $b_M \ldots b_1 b_0.a_1 a_2 \ldots$ be the binary representation of $x \in I = [0, 2^M]$ and $x=(b_M, \ldots, b_1, b_0; a_1, a_2, \ldots)$. Let us define a set $$I^{(k)} = \{x | x = (b_M, \ldots, b_0; a_1, a_2, \ldots, a_k)\}$$

as a set of truncated real numbers in I. Let $\text{trunc}_k: I \to I^{(k)}$ and $H: I^{(k)} \to \{0, 1\}$ be two functions defined as follows:

$$\text{trunc}_k(x) = (b_M, \ldots, b_0; a_1, a_2, \ldots, a_k) \quad (5)$$

and $$H(x) = a_1 \oplus a_2 \oplus \ldots \oplus a_k \quad (6)$$

The seed of the generator is the string of 0s and 1s of length M+k+1, which is written in the form $x_0 = (b_M, \ldots, b_0; a_1, \ldots, a_k)$. The output of the generator is a sequence of bits $X_1, X_2, \ldots$ produced as described hereinbelow.

Two sample pseudo-random bit generators are presented. In the first case the next bit is generated as:

$$x_{i+1} = trunc_k\left(\frac{p}{2^m} \cdot x_i \bmod 2^M\right) \quad (7)$$

$$X_{i+1} = H(x_{i+1}) \quad (8)$$

In the second case, the bit $X_i$ has been produced. The next bit is generated as:

$$y_i = x_i \oplus X_i \quad (9)$$

$$x_{i+1} = trunc_k\left(\frac{p}{2^m} \cdot y_i \bmod 2^M\right) \quad (10)$$

$$X_{i+1} = H(x_{i+1}) \quad (11)$$

In the above equations $i = 0, 1, 2 \ldots, p, m, M, k$ are the parameters of the generator, $X_0 = 0$ and $$x_i \oplus X_i = (\alpha_1, \alpha_2, \ldots) \oplus \beta = (\alpha_1 \oplus \beta, \alpha_2 \oplus \beta, \ldots)$$

Equations (7) and (10) are discrete version of (1). An additional parameter M has been introduced to make the algorithm more flexible: m can be an arbitrary integer, while $2^M$ is preferably a large number. The output of the generator is given by (8) or (11): instead of the sine function, a periodic function H defined by (6) is used. Finally, with (9) the initial point (seed) of the generator is changed in each iteration. The parameters of the generator have the following constraints: p is an arbitrary odd integer such that $p > 2^m$, M is an integer such that $M \geq 64$, $M \gg m$, m and k are arbitrary integers.

Simple arguments (not a proof) for an elementary explanation of the unpredictability of the generator are given. The next bit $X_{i+1}$ of the generator (or the previous bit $X_{i-1}$) may be determined only if all bits of $x_i$ are known, which is however, not possible: $x_i$ has the form $x_i = (c_M, \ldots, c_0; d_1, \ldots C_k)$ and one can only guess the value of $X_i$ among $2^M$ equally distributed values. Moreover, it has been numerically verified that the probability $p(X_j | X_{j-1} X_{j-2} \ldots)$ does not depend on the previous generated bits and is equal approximately to 0.5.

Let $G = \{G_n, n \geq 1\}$ be an ensemble of generators, with $G_n: \{0,1\}^n \to \{0,1\}^{p(n)}$, where $p(*)$ is a polynomial satisfying $n+1 \leq p(n) \leq n^c + c$ for some fixed integer c. It is well known that: if a cryptographically secure PRBG with $p(n) = n+1$ exists, then there is a cryptographically secure PRNG with $p(n) = n^c + c$ for each $c \geq 2$. Therefore, using all above arguments it is possible to conclude that the presented bit generators are cryptographically secure.

By defining p, m, M and k a particular pseudo-random number generator can be realized. Two examples are presented.

EXAMPLE 1

The generator is defined by equations (7) and (8). The parameters of the pseudo-random number generator are: $p = 5$, $m = 2$, $M = 256$ and $k = 2$.

EXAMPLE 2

The generator is defined with equations (9), (10) and (11). The parameters are: $p = 419$, $m = 8$, $M = 64$ and $k = 64$.

Statistical tests cannot prove that a sequence is random, tests can only show that a sequence is not random. In other words, tests help only to detect certain kinds of weaknesses a generator may have. If a sequence passes a finite number of statistical tests, it is not guaranteed that the sequence was indeed generated by a (truly) random number generator.

Five standard tests, commonly used for determining whether a binary sequence has some properties that a truly random sequence would be likely to exhibit, are [1]: frequency test, serial test, poker test, runs test, and autocorrelation test. Linear congruential generators pass standard tests. An additional package of tests was proposed in [18] for which standard random number generators (congruential, shift-register and lagged-Fibonacci generators) give poor results.

All these tests to the generators described in the previous section have been performed and the results are summarized in the following table.

TABLE 1

|  | PRNG1 | PRNG2 | PRNG3 |
|---|---|---|---|
| Birthday Spacings | FAIL | pass | pass |
| Overlapping 5-permutation | FAIL | pass | pass |
| Binary rank for 31 × 31 matrices | FAIL | pass | pass |
| Binary rank for 32 × 32 matrices | FAIL | pass | pass |
| Binary rank for 6 × 8 matrices | FAIL | pass | pass |
| Bistream | FAIL | pass | pass |
| OPSO | FAIL | pass | pass |
| OQSO | FAIL | pass | pass |
| DNA | FAIL | pass | pass |
| Count-the-1's on a stream of bytes | FAIL | pass | pass |
| Count-the-1's for specific bytes | FAIL | pass | pass |
| Parking lot | FAIL | pass | pass |
| Minimum distance | FAIL | pass | pass |
| 3DSpheres | FAIL | pass | pass |
| Squeeze | FAIL | pass | pass |
| Overlapping sums | pass | pass | pass |
| Runs | pass | pass | pass |
| Craps | FAIL | pass | pass |

PRNG1 is a linear congruential generator with $a = 84589$, $b = 45989$, and $m = 217728$. The values of the parameters are taken from [19]; we obtain similar results with different values for a, b and m. PRNG2 and PRNG3 are generators from Examples 1 and 2.

DESCRIPTION OF A HARDWARE GENERATOR ACCORDING TO AN EMBODIMENT OF THE INVENTION

Once the parameters p, m, k and M of equations 7 and 8 (or of equations 9, 10 and 11) are fixed, a hardware Pseudo Random Bit Generator may be easily and efficiently implemented.

Following Example 1 (PRNG2), we take $p = 5$, $m = 2$, $k = 2$ and $M = 256$. Now $x_i = b + a$, where (in base 2) $b = b_M \ldots b_1 b_0$ and $a = 0.a_1 a_2$, and $$\frac{p}{2^m} = 1 + \frac{1}{2^2}.$$

Then $$\left(\frac{p}{2^m} \cdot x_i\right) \bmod 2^M$$

can be rewritten as $$\left(b + \frac{1}{2^2}b + a + \frac{1}{2^2}a\right) \bmod 2^M$$

The term $$\frac{1}{2^2}b$$

can be obtained by shifting b by 2 bits towards right $$\left(\text{i.e., } \frac{1}{2^2}b = 00b_M \ldots b_3 b_2 \cdot b_1 b_0\right).$$

Moreover, since the term $$\frac{1}{2^2}a$$

is less than $$\frac{1}{2^2}b,$$

it is immaterial with respect to the truncation operation $\text{trunc}_2$ and we can omit it. At last, the mod $2^M$ operation is simply obtained by discarding the overflow of the M bit summation. Therefore, the quantity $$\text{trunc}_k\left(\left(\frac{p}{2^m} \cdot x_i\right) \bmod 2^M\right)$$

is substantially the sum between the two bit strings $b_M \ldots b_3 b_2 b_1 b_0.a_1 a_2 + 00 b_M \ldots b_3 b_2.b_1 b_0$.

Summing up, the operations involved in the PRNG2 are bit shift, bit sum and XOR (while, for examples, Micali-Blum generator uses power operators and Blum-Blum-Shub generator uses product). FIG. 1 depicts the application of the equations (7) and (8) at the generic i-th step.

In the above mentioned figure, the array of bit $b'_M \ldots b'_0.a'_1 a'_2$ indicates the result of the sum between $b_M \ldots b_3 b_2 b_1 b_0.a_1 a_2$ and $00 b_M \ldots b_3 b_2.b_1 b_0$ and is stored in a temporary buffer for (the base 2 representation of) $x_{i+1}$. At the subsequent (i+1)th step, the content of this buffer shall be overwritten on the bits $b_M \ldots b_3 b_2 b_1 b_0.a_1 a_2$.

Figure 2:
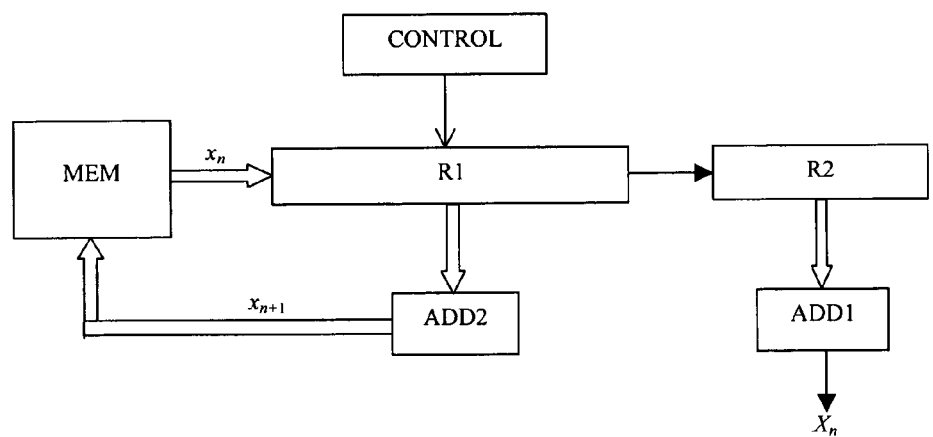
FIG. 2 is a hardware generator implementing an embodiment of the method of the invention.

A basic realization of a hardware generator of a chaos-based pseudo-random bit sequence of the invention is depicted in FIG. 2. It comprises a first memory buffer MEM in which storing bit strings representing integer numbers $x_n$ of the PRN sequence, a shift register R1 driven by a command circuit, a second memory buffer R2 storing the bits output by the shift register R1, a first adder ADD1 modulo 2 and a second adder ADD2.

Preliminarily, a seed $x_0$ is stored in the memory buffer MEM; then the desired bit sequence $X_n$ is generated by repeating cyclically the following steps:

the content of the first buffer is copied in the shift register R1;

the command circuit provides a certain number k of shift commands to the shift register R1, which outputs the k least significant bits of the string representing the number $x_n$;

the bits output by the shift register are stored in the second buffer R2 and are summed by the first adder modulo 2 ADD1, generating a bit $X_n$ of the chaos-based pseudo-random bit sequence;

the second adder ADD2 sums the bit strings currently stored in the shift register and in the memory MEM, generating a bit string representing a successive number $x_{n+1}$ of the pseudo-random sequence which is stored in the first buffer MEM.

The hardware generator of FIG. 2 may be used whatever the number k is.

Figure 3:
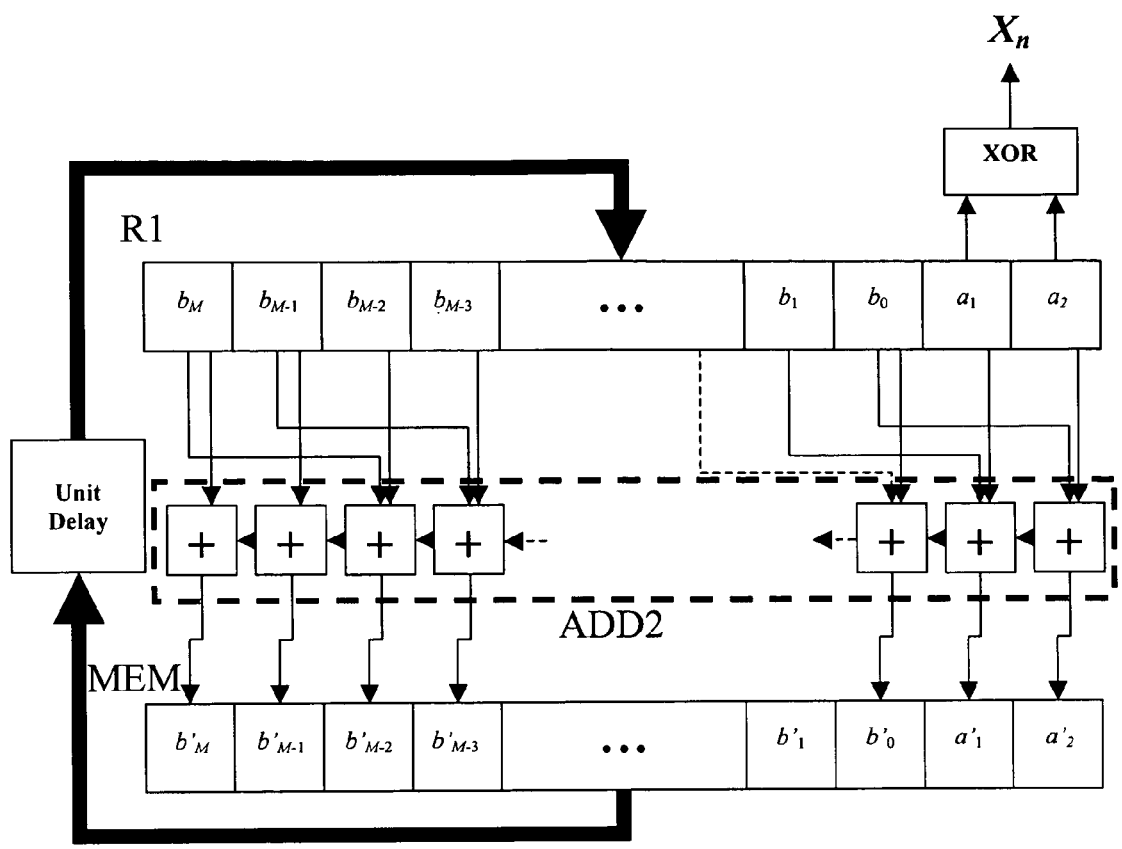
FIG. 3 is a particular embodiment of a hardware generator of the invention implementing the method described in FIG. 1 for k=2.

A simpler embodiment of a hardware generator according to an embodiment of the invention, especially designed for implementing the method for k=2, is depicted in FIG. 3. Differently from the generator of FIG. 2, the register R2 is not present and R1 can be a register of any kind.

Initially, the memory buffer MEM is loaded with a seed $x_0$, then according to the embodiment of the method of the invention described in FIG. 1 the following operations are carried out:

copying in the register R1 a bit string stored in the memory buffer MEM representing a current number $x_n$ of the pseudo-random sequence, generating a bit $X_n$ of chaos-based pseudo-random bit sequence by summing modulo 2 (XORing) the two (k=2) least significant bits of the bit string stored in the register R1, generating a bit string representing a successive number $x_{n+1}$ of the pseudo-random sequence by summing up the bit string representing the current number $x_n$ and the bit string obtained eliminating the two least significant bits of the bit string stored in the register R1, storing in the memory buffer MEM the bit string representing the successive number $x_{n+1}$.

As it will be apparent to the skilled practitioner, once the generator of FIG. 3 has been realized, it cannot be used for any value of k≠2, because it would be necessary to change the connections between the register R1 and the cascade of adding gates [+] that constitute the adder modulo 2 ADD2.

From the foregoing it will be appreciated that, although specific embodiments of the invention have been described herein for purposes of illustration, various modifications may be made without deviating from the spirit and scope of the invention.

REFERENCES

[1] A. Menezes, P. van Oorschot, and S. Vanstone, *Handbook of Applied Cryptography*, CRC Press, 1997.

[2] L. Kocarev, G. Jakimoski, G. Rizzotto, and P. Amato, "Chaos-based data protection using time-discrete dynamical systems", European Patent Application n.01 130846.7, 27 Dec. 2001.

[3] R. A. J. Matthews, "On the Derivation of a 'Chaotic' Encryption Algorithm", *Cryptologia*, vol.13, pp. 29-42 (1989); D. D. Wheeler, "Problems with Chaotic Cryptosystems", *Cryptologia*, vol. 13, pp. 243-250, (1989); D. D. Wheeler and R. A. J. Matthews, "Supercomputer Investigations of a Chaotic Encryption Algorithm", *Cryptologia*, vol.15, no. 2, pp.140-152 (1991).

[4] T. Kohda and A. Tsuneda, "Statistics of Chaotic Binary Sequences," *IEEE Trans. on Information Theory*, 43, pp.104-112 (1997).

[5] O. Goldreich, "Modern Cryptography, Probabilistic Proofs and Pseudorandomness," Springer-Verlag, Algorithms and Combinatorics, Vol 17, (1998).

[6] F. Italia, L. Kocarev, M. Porto, G. Rizzotto and T. Stojanovski, "Chaos Based Random Number Generators", European Patent Application n.01 830764.5, 13 Dec. 2001.

[7] A. Yao, "Theory and applications of trapdoor functions," *IEEE 23rd Symposium on Foundations of Computer Science*, pp. 80-91 (1982).

[8] M. Blum and S. Micali, "How to generate cryptographically storng sequences of pseudorandom bits," *IEEE 23rd Symposium on Foundations of Computer Science*, pp.112-117 (1982).

[9] W. Alexi, B. Chor, O. Goldreich, and C. P. Schnorr, "RSA/Rabin bits are $$\frac{1}{2} + \frac{1}{poly(\log n)}$$

secure, "*IEEE 25th Symposium on Foundations of Computer Science*, pp. 449-457 (1987).

[10] L. Blum, M. Blum, and M. Shub, "A Simple Unpredictable Pseudo-Random Number Generator," *SIAM J. Comput.*, 15, pp. 364-383 (1986).

[11] D. E. Knuth, *The Art of Computer Programming—Seminumerical Algorithms*, vol. 2, Reading, Mass.: Addison-Wesley Pub. Co., (1981).

[12] J. B. Plumstead, "Inferring a sequence generated by a linear congurence," *IEEE 23rd Symposium on Foundations of Computer Science*, pp.153-159 (1982).

[13] J. Boyar, "Inferring sequences produces by pseudo-random number generators," *Journal of the Association of Computing Machinery*, 36, pp.129-142 (1989).

[14] H. Krawczyk, "How to predict congurential generators," *Journal of Algorithms*, 13, pp. 527-545 (1992).

[15] A. M. Frieze, J. Hastad, R. Kannan, J. C. Lagarias, and S. Shamir, "Reconstructing truncated integer variables satisfying linear congruences," *SIAM Journal of Computing*, 17, pp. 262-280 (1988).

[16] J. Stern, "Secret linear congruential generators are not cryptographically secure," *IEEE 28th Symposium on Foundations of Computer Science*, pp. 421-426 (1987).

[17] J. Boyar, "Inferring sequences produces by a linear congruential generator missing low-order bits," *Journal of Cryptology*, 1, pp.177-184 (1989).

[18] http:H/stat.fsu.edu/geo/diehard.html

[19] B. Schneier, *Applied cryptography: protocols, algorithms, and source code in C*, 2nd Ed. New York: John Wiley&Sons, 1996.

What is claimed is:

1. A computer-implemented method for generating a chaos-based pseudo-random sequence (Xn) comprising the steps of:

defining a chaotic map for generating a pseudo-random sequence of integer numbers (xn) comprised in a certain interval ([0, q]);

defining a function (H(x)) on a first interval (x [0, q]) whose inverse has a plurality of branches;

choosing a seed (x0) of said pseudo-random sequence of integer numbers (xn) comprised in said interval ([0, q]);

generating numbers of said pseudo-random sequence (xn);

calculating numbers of a chaos-based pseudo-random sequence (Xn) by applying said function (H(x)) to corresponding integer numbers of said pseudo-random sequence (xn);

storing said chaos-based pseudo-random sequence (Xn) in a circuit; and generating encrypted data, using a computer-implemented data generator, on a computer-readable medium by utilizing said chaos-based pseudo-random sequence (Xn) in an encryption application executing on a computer;

wherein said chaotic map is a linear congruential generator defined by:

choosing a first integer number (m);

choosing a second odd integer number (p) greater than the power of 2 raised to said first integer number (2m);

choosing a third integer number (M) much greater than said first integer number (m);

said chaotic map being defined by the following equation:

$$x_{n+1} = \left(\frac{p}{2^m} \cdot x_n\right) \mod 2^M.$$

2. The method of claim 1, wherein the inverse of said function (H(x)) has a number of branches equal to the largest bound (q) of said interval ([0, q]).

3. The method of claim 1, wherein defining said function (H(x)) comprises defining (H(x)) such that it may assume only two values ( ).

4. The method of claim 3, comprising the steps of:

representing in binary form said integer numbers (xn) of said pseudo-random sequence;

defining a second integer number k;

defining said function (H(x)) as the binary sum of the k least significant bits of the binary representation of its argument (x).

5. The method of claim 4, comprising the steps of:

providing circuit means for storing bit strings representing integer numbers (xn) of said pseudo-random sequence;

providing a shift register (R1) coupled to said circuit means;

storing a seed (x0) in said circuit means;

carrying out cyclically the following operations:

copying in said shift register (R1) a bit string stored in the circuit means representing a current number (xn) of said pseudo-random sequence, providing k shift commands to said shift register, generating a bit (Xn) of said chaos-based pseudo-random bit sequence by summing modulo 2 the k bits output by said shift register, generating a bit string representing a successive number (xn+1) of said pseudo-random sequence by summing up the bit string currently stored in said shift register (R1) and the bit string representing said current number (xn), storing in the circuit means the bit string representing said successive number (xn+1).

6. The method of claim 4, comprising the steps of:
providing circuit means for storing bit strings representing integer numbers (xn) of said pseudo-random sequence;
providing a register coupled to said circuit means;
storing a seed (x0) in said circuit means;
carrying out cyclically the following operations:
copying in said register a bit string stored in the circuit means representing a current number (xn) of said pseudo-random sequence,
generating a bit (Xn) of said chaos-based pseudo-random bit sequence by summing modulo 2 the k least significant bits of the bit string stored in said register,
generating a bit string representing a successive number (xn+1) of said pseudo-random sequence by summing up the bit string representing said current number (xn) and the bit string obtained eliminating the k least significant bits of the bit string stored in said register,
storing in the circuit means the bit string representing said successive number (xn+1).

7. The method of claim 3, wherein said chaotic map is a truncated linear congruential generator.

8. The method of claim 7, wherein said truncated linear congruential generator is defined by:
choosing a first integer number (m);
choosing a second odd integer number (p) greater than the power of 2 raised to said first integer number (2M);
choosing a third integer number (M) much greater than said first integer number (m);
said chaotic map being defined by the following equation:

$$x_{n+1} = trunc_k \left( \left( \frac{p}{2^m} \cdot x_n \right) \mod 2^M \right).$$

9. The method of claim 7, wherein said linear congruential generator is defined by:
choosing a first integer number (m);
choosing a second odd integer number (p) greater than the power of 2 raised to said first integer number (2m);
choosing a third integer number (M) much greater than said first integer number (m);
said chaotic map being defined by the following equations:

$$\begin{cases} y_n = x_n \oplus X_n \\ x_{n+1} = trunc_k \left( \left( \frac{p}{2^m} \cdot y_n \right) \mod 2^M \right) \end{cases}.$$

10. The method according to claim 1 wherein said third integer number (M) is greater than or equal to 64.

11. A generator of chaos-based pseudo-random bit sequences operable in an encryption application, comprising:
circuit means for storing bit strings representing integer numbers (xn) of said pseudo-random sequence;
a register coupled to said circuit means;
an adder modulo 2 summing the k least significant bits of the of the bit string stored in said register, generating a bit (Xn) of said chaos-based pseudo-random bit sequence;
a second adder summing up the bit string representing said current number (xn) and the bit string obtained eliminating the k least significant bits of the bit string stored in said register; and
a data generator for generating encrypted data on a computer-readable medium based on said pseudo-random sequence.

12. A generator of chaos-based pseudo-random bit sequences operable in an encryption application, comprising:
circuit means for storing bit strings representing integer numbers (xn) of said pseudo-random sequence;
a shift register coupled to said circuit means;
a command circuit generating shift commands for said shift register;
second circuit means for storing the bits output by said shift register;
an adder modulo 2 summing the bits stored in said second circuit means, generating a bit (Xn) of said chaos-based pseudo-random bit sequence;
a second adder summing up the bit strings currently stored in said shift register and in said first circuit means, generating a bit string representing a successive number (xn+1) of said pseudo-random sequence; and
a data generator for generating encrypted data on a computer-readable medium based on said pseudo-random sequence.

* * * * *